Oct. 4, 1955 R. V. STOTLER 2,719,336
METHOD AND APPARATUS FOR CONVEYING AND SEVERING MINERAL FIBERS
Filed Aug. 19, 1950 3 Sheets-Sheet 3
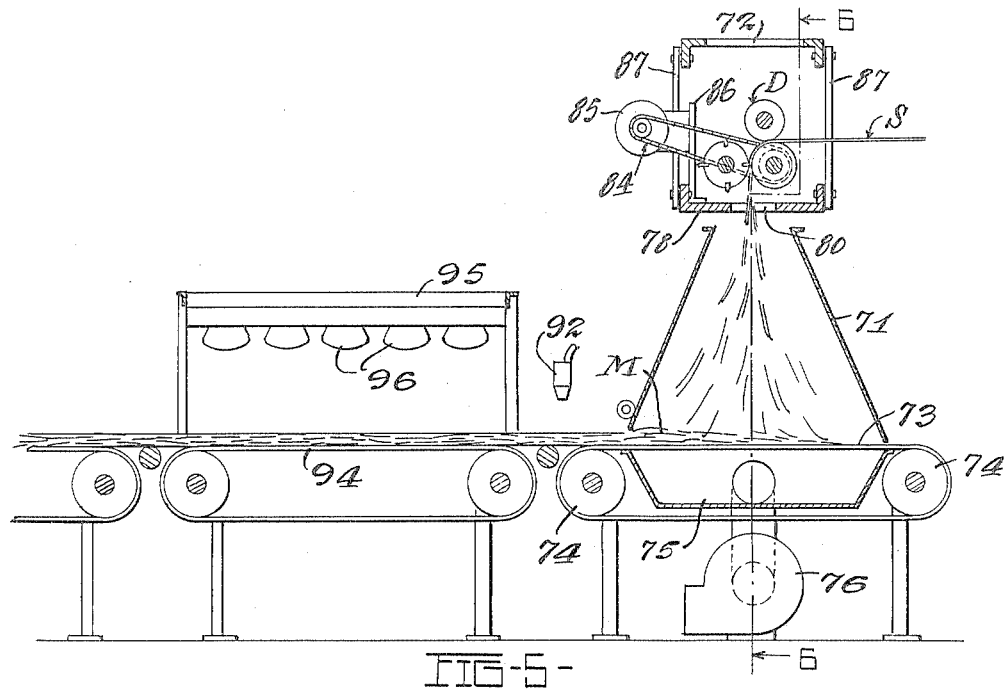
FIG-5-
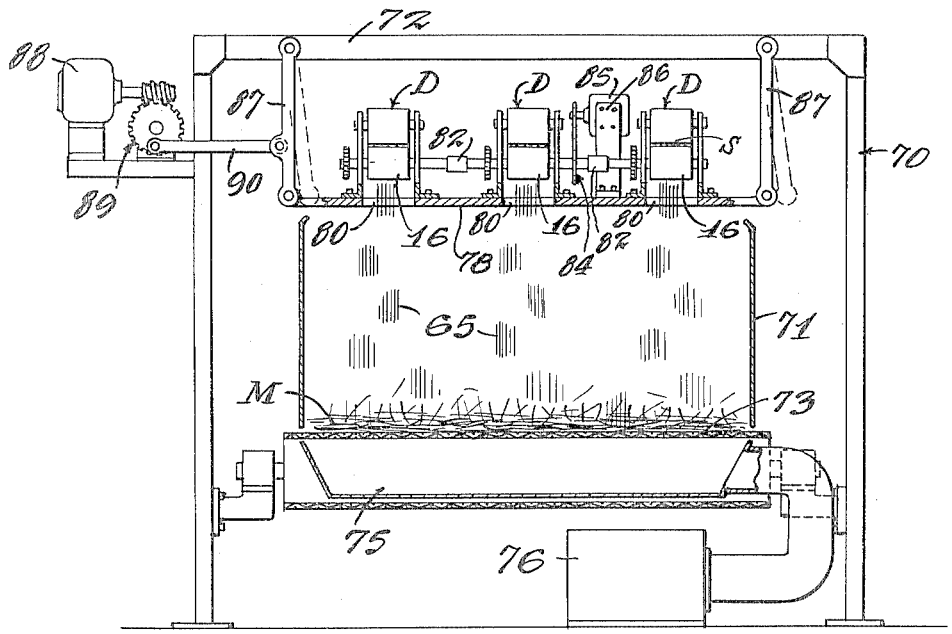
FIG-6-
INVENTOR:
RICHARD V. STOTLER.
BY
ATTYS.

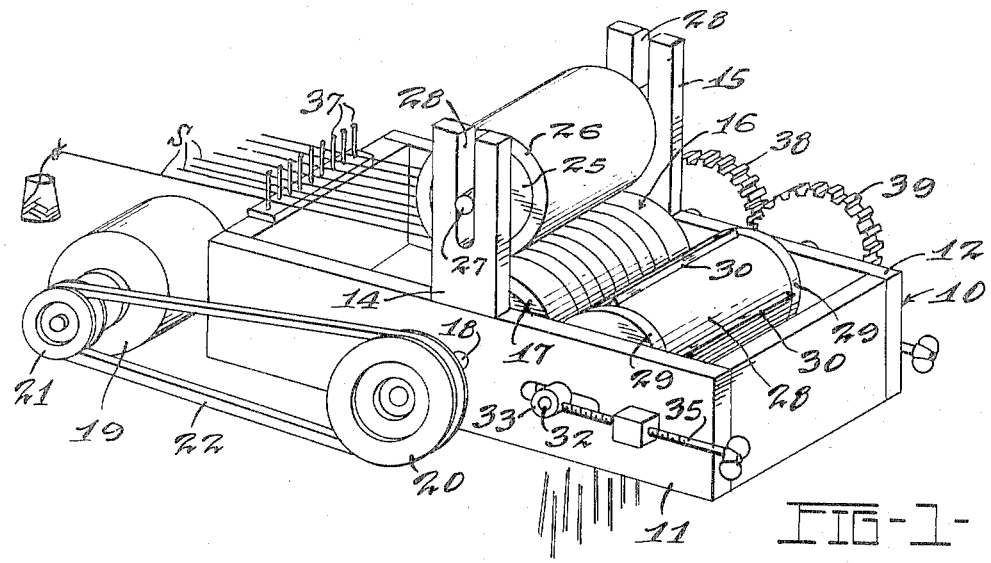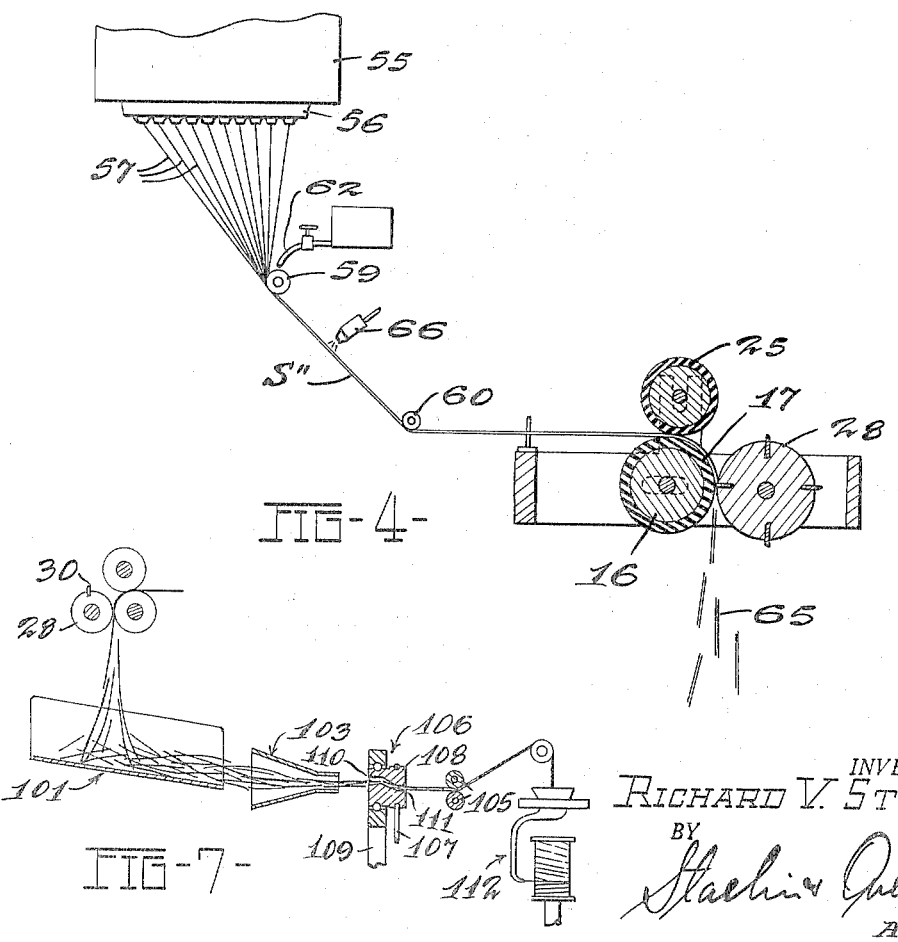

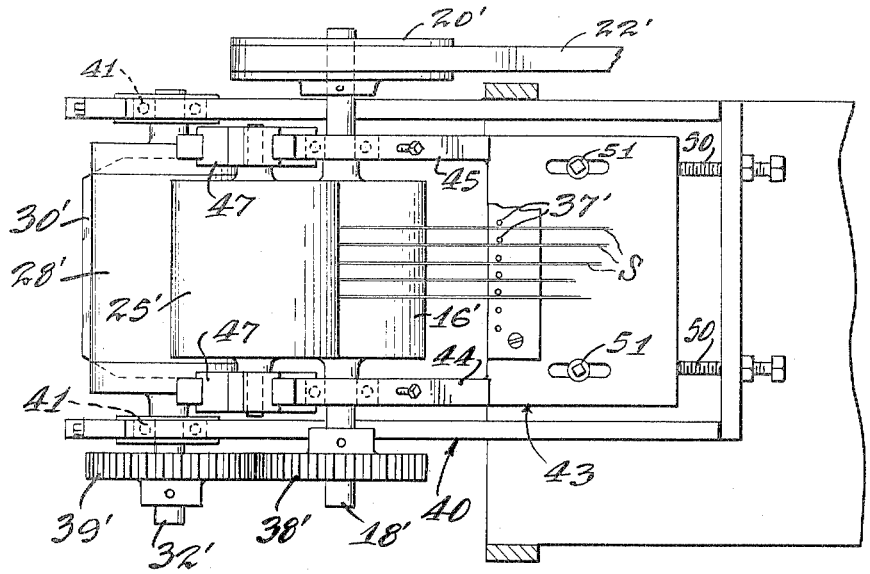
FIG-3-
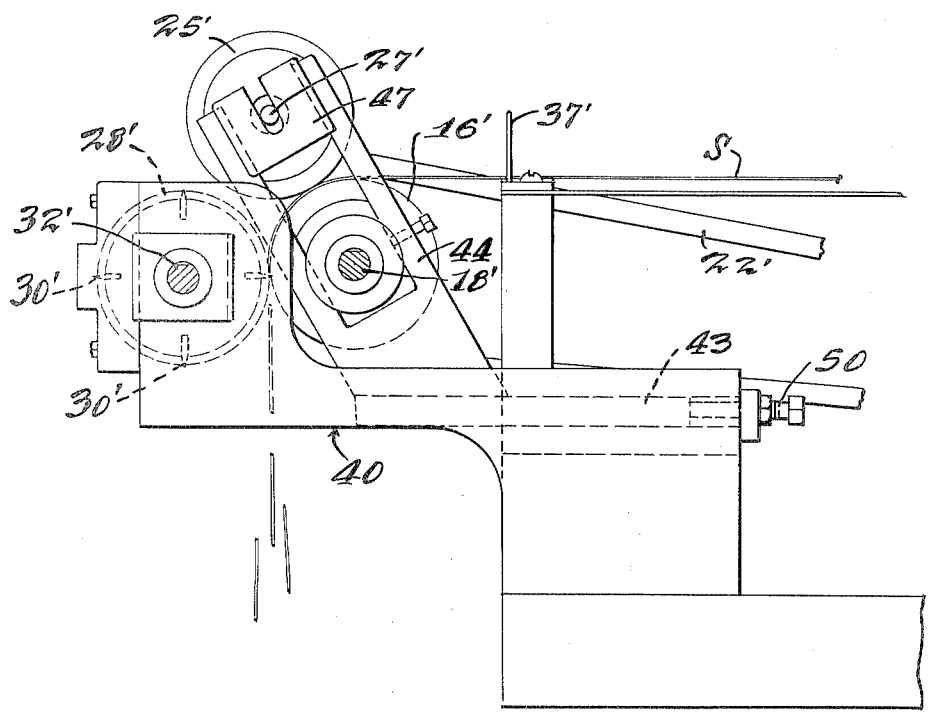
FIG-2-

United States Patent Office 2,719,336
Patented Oct. 4, 1955

2,719,336

METHOD AND APPARATUS FOR CONVEYING AND SEVERING MINERAL FIBERS

Richard V. Stotler, Huntingdon, Pa., assignor to Owens-Corning Fiberglas Corporation, a corporation of Delaware Application August 19, 1950, Serial No. 180,348

4 Claims. (Cl. 19—155)

This invention relates to method and apparatus for producing comparatively short lengths of fibers or strands of fibers of mineral materials so as to render them suitable for fabrication into finished articles or units.

It has been a practice to form mineral fibers, as for example glass fibers into strand formation and condition the strands and sever them into comparatively short lengths. The cut or chopped strands of fibers have been used to form mats and as reinforcing mediums for incorporation with a resin or plastic having thermo-setting or thermo-settable characteristics in the production of molded articles.

In producing bonded mats of cut or chopped strands of mineral fibers, for example, glass fibers, several factors have a bearing upon the formation of a satisfactory reinforcement. One of the principal objectives in fabricating a mat is to secure a proper distribution of the fibrous material to provide uniform density and other characteristics in the product. The fibers must not be too short as such condition materially reduces the strength of the mass. Another factor which is important in producing such mats is to orient the cut or chopped strands of fibers in a fluffy mass wherein the strands are individually disposed in variout directions to provide uniformity of strength throughout the mass in contradistinction to the unequal distribution of cut or chopped strands collected in groups or clumps. This latter condition produces great variations in the density of the mass and reduces the fluffiness thereof. It also increases the cost of the mat by reason of the excess weight of concentrated groups of strands which are superfluous since the density of the mat must be based upon the less dense areas and any greater density by reason of the concentrations is undesirable.

The proper distribution of individual cut strands throughout the mat is imperative in order to provide a mat of proper density with adequate strength characteristics when bonded.

In prior processes of producing mats or preforms of chopped fibers, it has been necessary to cause the fibers of the strands to adhere in order that the strands have a high degree of integrity and remain in strand form during processing. One of the methods of producing cut or chopped strands involves the formation of continuous strands of attenuated glass fibers to which a binding medium or adhesive is applied. The adhesive bearing strand is formed at a high linear speed and is wound into a tube or package in a conventional manner. By reason of the high winding speed, the adhesive or binder on the strand is not completely set or hardened and as a consequence the convolutions of strand are more or less bonded or adhesively joined inter se. After the tube is wound with a substantial amount of strand, the operator severs the packaged strand lengthwise. The mass of strands is then spread by hand on a conveyor belt which carries the strands into a spiral cutter or chopper which cuts the strands into shorter lengths. The chopped strands are not of uniform length, and depending on the condition of "set" of the binder are to an extent tangled or joined together in groups or clumps. Such condition renders the collected mass of severed strands unsuitable as a mat structure or for most fabricating purposes especially as reinforcing preforms. In order to effect a separation of the tangled groups or clumps of cut strands, the mass is subjected to the action of mechanical separation devices or pickers. This process has not been entirely satisfactory as the picking operations, if continued until complete disintegration of all the strand groups and clumps is attained, would cause a large number of strands to be opened up and individual fibers separated therefrom. The separation of an extensive number of fibers from the strands impairs the strength of the ultimate product as the mass strength to a great extent lies in the preservation of the fibers in strand orientation. Such processing or methods have been comparatively expensive in that they require extensive hand labor and costly equipment and the end results have not been entirely satisfactory because of lack of uniformity of lengths of cut strands and insufficient or inadequate control of the extent of breaking up or separating the clumps or tangled groups of cut strands. The lack of homogeneity of the body or mass of cut strands results in nonuniform distribution of the reinforcement in molded products embodying same. In some portions of a molded product, an excess number or accumulation of clumps of strands may predominate while other portions of the product reveal insufficient fibrous material.

It has been proposed to utilize cut strands and fibers in fabricating twisted strands, cord, twine and the like but the above mentioned methods of forming cut strands have not been found satisfactory for such purposes primarily because of lack of control to produce individual severed strands or subdivided strands which are essential forms of fibers in producing twisted strands, cord, twine and the like. Furthermore, the presence of tangled clumps or groups of cut strands encountered in such processes preclude the formation of commercially usable twisted materials of this character.

The present invention embraces a method of conditioning continuous strands of mineral fibers such as strands of attenuated glass fibers and an improved method and means for severing them into comparatively short lengths in a manner whereby the interadhesion factor of the fibers in the strands does not cause the severed strands to adhere or collect in clumps but the severed strands in a collected mass are in individual orientation.

An object of the invention resides in provision of a method and apparatus for handling and severing lengths of strands from a supply of continuous strands whereby the individual cut strands are of a controlled length to obtain substantially uniform distribution of individual strands in a collected mass and groups of cohering strands are substantially eliminated.

Another object of the invention resides in the provision of an apparatus for severing strands of mineral filaments or fibers into desired lengths wherein the strands may be supplied to the apparatus in preformed condition obtained from tubes supported on a creel, or the apparatus utilized to attenuate the fibers directly from a fiber forming zone and concomitantly sever the strands of attenuated fibers into predetermined lengths.

The present invention provides a method of controlling a moving group of fibers so that they are engaged by a cutting instrumentality in a manner whereby the severed fibers are of substantially uniform length which are directed to a fiber receiving zone away from the influence of the cutting instrumentality in an orderly manner.

Another object of the invention is the provision of a simple yet effective apparatus for severing lengths of mineral fibers in strand formation whereby the cut lengths of strands or fibers may be collected directly into mat or other predetermined formation and a binder applied to establish fixation of a finished mat.

Another object of the invention resides in a method and apparatus of producing cut fibers or strands in which a high rate of productivity is obtained through the utilization of a minimum of low cost equipment whereby cut fibers and strands may be obtained economically.

Another object is the provision of a combined strand conveying and severing means including rotatable means capable of high speed operation whereby strands of glass fibers or filaments may be continuously severed or cut into short lengths of uniform or desired dimension with a minimum expenditure of power, the conveying and severing equipment being of simple, dependable construction and occupying a very small space.

Another object is the provision of a simple, yet effective, method of producing severed strands of mineral fibers suitable for forming twisted strands, yarns, cord, twine and like products.

Still a further object is the inclusion of a simple yet effective apparatus which may be utilized to attenuate fibers directly from a fiber forming zone and concomitantly sever the fibers to predetermined desired lengths whereby the character of the accumulated fibers and groups of fibers in cut strand formation may be controlled and obtained without resort to additional mechanical processes or operations, the apparatus being capable of operating at a high speed so that a high rate of production per unit of time of cut strands or fibers is obtainable.

The invention is susceptible of utilization for processing mineral fibers or filaments in various forms as for example multifilament or fiber strands in twisted or untwisted form, in side by side relation or ribbon configuration or in other forms and may be advantageously employed for concomitantly attenuating mineral fibers directly from a fiber forming zone and severing the attenuated fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an isometric view illustrating a form of apparatus for carrying out the method of the invention;

Figure 2 is an elevational view showing a modified form of apparatus of the invention;

Figure 3 is a top plan view of the construction illustrated in Figure 2;

Figure 4 is a semidiagrammatic illustration of the apparatus employed for performing fiber attenuation and fiber severing operations;

Figure 5 is a semidiagrammatic elevational view illustrating a method and apparatus particularly adapted for forming mats of cut fibers;

Figure 6 is a transverse sectional view taken substantially on the line 6—6 of Figure 5, and Figure 7 is a semidiagrammatic illustration of the method utilized to form twisted strands of severed fibers.

The apparatus of the invention is inclusive of a relatively movable fiber engaging medium cooperating with a movable fiber severing instrumentality wherein fibers or strands of fibers are cut into predetermined lengths as the severing instrumentality successively contacts the fibers on the conveying surface. The fiber severing instrumentality is preferably arranged to travel at a linear rate substantially the same as the rate of travel of the mineral fibers whereby complete control of the supply strands and cut fibers may be had without the addition of extraneous control means.

The arrangement of the apparatus shown in Figure 1 is inclusive of a frame 10 having opposed spaced side walls 11 and 12 which are respectively provided with upwardly extending members 14 and 15. The frame 10 is of hollow construction and accommodates a cylindrical element or roll 16 supported upon a shaft 18 journaled for rotation in suitable bearings (not shown) carried by the frame walls 11 and 12. The roll 16 may be driven by a motor 19 through the medium of suitable means as for example a pulley 20 secured upon the shaft 18 and connected to a pulley 21 on the motor shaft by means of a belt 22 or other power transmission connection. The roll 16 is preferably provided with a cylindrical sleeve 17 of yieldable or resilient material such as rubber or the like which presents a fiber or strand engaging surface for supporting and conveying fibers or strands S from a supply thereof to a severing zone and serves as a movable abutment for cooperation with a fiber or strand severing means.

The apparatus is inclusive of means arranged for cooperation with the fiber supporting surface or roll 16 for aiding in establishing frictional engagement of the fibers or strands with the roll 16. In the form of apparatus illustrated in Figure 1, there is employed a roll or cylinder 25 which is mounted upon a shaft 27, the latter being guided into proper cooperative relation with the roll 16 by means of slots 28 formed in the uprights 14 and 15. The walls of the slots 28 serve to maintain the axes of the rolls 16 and 25 in co-ordinated relation yet permitting vertical movement of the roll 25 so as to admit the passage between rolls 16 and 25 of fibers or filaments being conveyed to the severing zone. The cylinder 25 is preferably formed of steel or the like providing a load factor adequate to bear upon the strands or fibers disposed between the rolls setting up a friction component sufficient to insure that the driven roll 16 will draw the strands or fibers S from the supply without appreciable slippage. If desired the exterior periphery of the cylinder 25 may be covered or sheathed by a sleeve of yieldable material 26 such as rubber or the like similar to that carried on the roll 16.

Disposed adjacent the strand conveying surface 17 of roll 16 is a fiber or strand severing means. The severing means is inclusive of a cylindrically shaped member or roll 28 which supports one or more severing instrumentalities or knives 30. In the embodiment illustrated, there are four severing bars or knives 30 equally spaced about the periphery of the member or roll 28 which are secured thereto by suitable collars 29 disposed adjacent the ends of the roll. The peripheral surface of roll 28 is imperforate in the spaces between adjacent severing bars so as to assist in guiding the fibers or strands downwardly between the rolls 16 and 28 and to aid in maintaining the fibers or strands in engagement with the yieldable surface 17 of roll 16.

The cutting or severing instrumentalities or knives 30 project radially of the axis of the cylinder 28 and outwardly of the cylindrical surface of the roller so as to facilitate engagement of the knives 30 with the fibers or strands S and the yieldable surface 17 of the roll 16 to effect a severing of the fibers or strands into predetermined lengths. The roll 28 is supported upon a shaft 32 mounted in suitable bearings 33 which may be adjusted toward or away from the axis of the shaft 18 by adjusting screws 35 so that the axis of shaft 32 may be brought into proper parallel relation with the axis of shaft 18 and to provide for adjustment of the relative position of the roll 28 to assure its cooperation with the fiber supporting and conveying roll 16.

The fibers or strands of fibers may be presented to the conveying and severing mechanism in twisted or untwisted linear relationship, in ribbon like form, or in strand or yarn formation and may be fed to the fiber conveying and severing means above described from a suitable creel supporting a supply of strands. As shown in Figure 1 there is preferably provided a strand guiding means 37 in the form of spaced guide pins which serve to laterally space several strands that may be simultaneously processed through the conveying and severing means.

The knife supporting roll 28 may be driven by meshing gears 38, 39 connecting the shafts 18 and 32 the gears being of a size whereby the linear peripheral speed of the knives moving about the axis of shaft 32 is substantially equal to the linear peripheral speed of the fiber supporting surface of the roll 16.

In carrying out the method through the apparatus above described, one or more linear groups or strands S of fibers or filaments are directed between the rolls 16 and 25 so that upon energization of the motor 19 the roll 16 automatically advances the strands of fibers. After the strands are initially started through the rolls, they follow the peripheral contour of the roll 16 under the guiding influence of the cylindrical surface of the knife carrying roll 28 and are conveyed downwardly as illustrated in Figure 1 to the severing zone in which the knives 30 successively engage the moving strands of fibers to sever the same into predetermined lengths. The lengths of the cut strands of fibers are determined by the peripheral linear distances between adjacent strand severing knives or bars 30. The cut strands may pass downwardly under the influence of gravity to be collected by any suitable means or they may be conveyed to a station remote from the severing zone by a moving air stream or other suitable motivating means.

Any number of bars or cutting knives 30 may be used spaced peripherally on the member 28 to secure desired lengths of cut strands. The roll 25 provides a combined pressure and guiding means to frictionally hold the strands of fibers or filaments S in contact with the yieldable surface 17 of driven roll 16 so that the strands will be continuously drawn and conveyed to the strand severing station or zone. It should be noted that the linear peripheral speed of the knife supporting member 28 is substantially equal to the peripheral speed of the strand feeding roll 17 so that there is no appreciable relative movement between the strands and the moving severing knives as both are moving in the same general direction at substantially the same speed. By reason of this arrangement one or more strands of fibers or filaments may be advanced at speeds in excess of five thousand feet per minute and cut into predetermined lengths in an orderly fashion with a minimum of disruptive movement of the cut strands of fibers and without any interruption of the supply strands.

Figures 2 and 3 illustrate a modified form of apparatus including a frame 40 formed with spaced wall portions provided with bearings 41 journally supporting a knife carrying roll 28' equipped with strand severing knives 30'. A member 43 provided with upwardly extending, angularly arranged, bifurcated portions 44, 45 is adjustably supported on the frame 40. The portions 44, 45 support antifriction bearings in which is journally mounted the strand supporting and feeding roll 16'. Disposed between the bifurcated configurations of the uprights 44 and 45 are guide blocks 47 having slots to receive the shaft 27' of roll 25'. The slots provide for unrestricted movement of the roll 25' in a direction radially of a diameter of roll 16' in parallelism with the angular direction of disposition of portions 44 and 45 so that the weight of the roll 25' is effective against the strands S adjacent roll 16' to establish a friction component between the strands and roll 16'.

The relative angular positioning of roll 25' as shown in Figure 2 has been found to provide for an effective and efficient engagement of the strands with the feed roll, this being attributed in part to the bending of the strands about a cylindrical surface portion of the roll 16' before the strands pass between the rolls 16' and 25'. The position of the rolls 16' and 25' may be adjusted by means of screws 50 acting against member 43, the latter being locked in adjusted position by means of 51.

The member or cylinder 16' may be driven by means of a pulley 20' and belt 22' from a motor (not shown) or other suitable source of power as in the form of the invention illustrated in Figure 1. The shafts 18' and 32' respectively carrying the roll 16' and knife supporting roll 28' may be provided with intermeshing gears 38' and 39' whereby the rolls 16' and 28' are simultaneously rotated in a direction to cause the strands of fibers S to move between the rolls. The gears may be formed with an unequal number of teeth, for example, one of the gears may have 50 teeth and the other 51 providing a slight differential in peripheral speed between rolls 16' and 28' so that during each successive revolution of the knife carrying roll 28' the knives will engage at a slightly different zone on the resilient surface of feed roll 16' during each 50 revolutions of the mechanism. By this displacement of the points of engagement of the severing bars with the feed drum 16' during successive revolutions thereof the useful life of the resilient surface of the roll is thereby greatly prolonged.

Figure 4 illustrates a method of attenuating mineral fibers and concomitantly severing the attenuated fibers utilizing the present invention. A bushing 55 is adapted to contain a quantity of molten fiber forming mineral material such as glass which is provided with a feeder bushing 56 having a plurality of outlet openings through which streams of glass 57 flow downwardly from the bushing. The several glass streams are attenuated into fine fibers which are gathered together into strand formation by means of a guide 59, the strand S'' passing over a guide 60 is directed into frictional engagement with the yieldable surface 17 of roll 16. The roller 25 bearing upon the strand S'' establishes sufficient friction between the strand and the surface 17 whereby rotation of the roll 16 is effective to draw the strands S'' through the severing device, the tension on the strands forming the attenuating force to form the molten glass streams 57 into fine glass fibers. It should be noted that in this method of fiber formation that the fibers are continuous, the continuity of which is preserved in the strands S''.

If desired, a lubricant may be applied to the strand through a tube 62 to the fiber gathering roll or guide 59 so as to minimize abrasion or interfriction of the fibers. The severed or cut strands 65 derived from the continuous strands S'' are practically in the form of independent or separate fibers because of the absence of any binder or other factor lending mass integrity to the strands. If it is desired to establish a degree of adhesion among the independent fibers in the strand, this may be accomplished by applying a suitable binder or adhesive by means of a jet or applicator 66. By controlling the amount and character of the adhesive, the extent that the cut strands are opened or the number of independent fibers separated from the cut groups of fibers or strands may be regulated so as to obtain a desired ratio of independent fibers to cut strands or groups of fibers obtained from the severing device.

Figures 5 and 6 are semidiagrammatic illustrations of the method and apparatus of the invention utilized in the formation and collection of the cut strands in a mass or the production of a mat by the deposition of the cut strands on a surface that is moved away from the point of deposition at a controlled linear speed less than the controlled linear speed of the strands. The arrangement is inclusive of a frame 70 and disposed adjacent the frame is a hood 71 for directing cut fibers on to a collecting surface or conveyor 73 mounted on rollers 74 of conventional type. The fiber collecting surface 73 is of foraminous character and disposed beneath the conveyor, and in registration with the area bounded by the lower part of the hood 71 is a chamber 75 connected with a suction producing means or blower 76 for setting up a zone of subatmospheric or reduced pressure in the chamber 75 for the purpose of facilitating the removal of the cut strands or fibers from the severing zone and their collection on a collecting surface or conveyor.

Means may be provided for utilizing one or more of the strand or fiber conveying and severing mechanisms of the invention for producing a mat of intermingled cut strands of fibers. In Figures 5 and 6 there is illustrated an arrangement utilizing a plurality of strand severing devices preferably mounted for transverse movement relative to the conveyor or collecting surface 73 in order to effect a deposition of the cut strands in a manner to secure substantially uniform thickness throughout the entire area of the mat. To this end there is disposed above the hood 71 a transversely movable element 78 upon which is supported a plurality of transversely spaced strand severing devices D of the character or form illustrated in Figure 1 or Figure 3 of the drawings. The element 78 being of plate-like configuration is provided with a series of openings 80 through which the cut strands and fibers pass into the chamber formed by the hood 71. The operating shafts of the strand conveying and supporting rolls 16 may be connected together by suitable couplings 82 and driven by a belt and pulley arrangement 84 from a motor 85 mounted upon a bracket 86 mounted on the member 78. The member 78 may be supported for oscillatory movement in a direction transversely of the movement of the conveyor 73. As illustrated a plurality of links 87 are pivotally connected to member 78 and to a cross-member 72 of the frame 70 to provide for oscillatory movement of member 78. Oscillation of the member 78 may be accomplished by suitable means as for example a motor 88 driving a worm and worm wheel mechanism 89, the latter mechanism being connected by means of a link 90 to one of the links 87. The connection of link 90 with the worm wheel of the gearing 89 is offset from the axis of the worm wheel so that operation of the gearing by the motor 88 will reciprocate or oscillate the element 78 in a direction transversely of the lengthwise movement of the conveyor 73. By providing for movement of the strand conveying and strand severing means transversely of the conveyor 73, the cut strands of fibers 65 are distributed substantially uniformly over the conveyor 73 to form a mat M eliminating undulated configurations or piling up of the short lengths of strands in spaced zones.

The conveyor 73 is arranged for movement in a left-hand direction as viewed in Figure 5 at a controlled linear speed less than the linear speed of the strands so that the mat M accumulates across the conveyor 73 within the confines of the hood 71 as illustrated in Figure 5 being built up to a desired thickness, the conveyor 73 then carrying the formed mat away from the hood 71. If desired a binder or adhesive may be applied by jets 92 or other suitable applicator means to provide for mass integrity of the fibrous mat. The mat may be carried by conveying means 94 through an oven or curing chamber 95 in which may be disposed heat lamps 96 or other heating devices for thermo-curing the binder or adhesive in the mat structure. The mat is thereafter conveyed from the oven to be cut to suitable size or for other disposition.

It is to be understood that the arrangement of Figures 5 and 6 is illustrative of a method of forming an accumulated mass of cut strands or a mat structure directly from the strand severing devices. It is to be understood that the strands S fed to the severing devices may be obtained from tubes or spools of strands of glass fibers or the arrangement or method illustrated in Figure 4 may be utilized whereby the strands of fibers fed to the severing devices D shown in Figures 5 and 6 may be taken directly from a fiber forming apparatus. The establishment of subatmospheric pressure for removing the cut strands from the severing zone may be employed to convey the cut strands to another station or zone for further processing.

Figure 7 illustrates the method of the invention utilized in the formation of twisted strands, cord, twine or the like from cut strands and fibers whereby the end products are made of staple type fibers obtained directly from the severing device and converted into a twisted or plied formation. When the strand severing device or instrumentality is used to produce cut strands or fibers for this purpose it is desirable that the longest severed strands be obtained and hence a single severing knife 30 is employed on the roll 28 producing strand lengths equal to the circumference of the roll. Thus if roll 28 is of a diameter of three inches, the severed strands are slightly more than nine inches in length.

As the continuous strands are severed, they are released from the severing zone and fall by gravity into a collecting trough or member 101 which may be generally V-shaped in cross section to facilitate longitudinal orientation of the severed fibers and strands preparatory to the formation of the twisted product. As the cut strands fall into the trough 101 they are drawn into a gathering funnel or guide 103 by pulling rolls 105.

As the cut strands and fibers leave the trough they are generally disposed lengthwise of the trough and form a roving or sliver of collocated short length strands and fibers in longitudinal overlapping relation, the number of cut strands and fibers making up the roving depending upon the correlation of speeds of the strand severing device and the pulling rolls 105.

The funnel 103 serves to guide or condense the roving prior to its passage through a twister mechanism 106 to form a twisted strand, cord or the like. The twister may be of conventional character, that illustrated being inclusive of a rotor 108 rotatably journaled on a support 109. The rotor 108 may be revolved by means of a belt 107 connected to an electric motor (not shown) and is formed with an eccentrically arranged entrance 110 in communication with an axially disposed exit 111.

As the rotor 108 revolves it turns the strand about its longitudinal axis and the turning or twisting of the strand extends to the pulling rolls 105 on one side and into the cut strands in the trough 101 on the opposite side of the twister. This twisting of the strand and of the loose roving in the trough and funnel tends to progressively pick up and fold in the successively deposited cut strands and fibers and coordinate them into an integral body or cord. The twisted strand or cord is then wound into a package by conventional winding machinery indicated at 112 where additional twist may be imparted to the fibrous body, if desired.

If desired, a fiber integrating medium, binder or adhesive may be applied to the roving on the twisted strand to lend integrity or fixation to the strand. The binder or adhesive may be cured or dried by conventional methods.

Through the method and apparatus of the invention the difficulties of the cut strands adhering together to form clumps or groups have been eliminated and a precision control of the lengths of the cut strands is established. Furthermore, the present method is readily adaptable to the production of a mass of substantially intact cut strands, or a mass of cut strands and some individual fibers separated therefrom, the ratio being dependent upon the character and application of the adhesive or integrating factor in the fibers of the supply strand.

It will thus be apparent that the method and apparatus of the present invention therefore provides a simple yet effective, efficient and economical mode of producing comparatively short lengths of strands or a mixture of short length strands and separated fibers usable for many purposes, these beneficial results being attained through the utilization of compact and inexpensive apparatus involving a minimum of moving elements enhancing the useful life of the mechanism.

I claim:
1. A method for fabricating a continuous uniformly dense mass of controlled thickness of heterogeneously arranged, short, multifilament strands that comprises feeding a plurality of continuous multifilament strands along an arcuate path at a controlled linear speed supporting said strands along the entire arcuate path, resiliently grasping said strands snugly at one point along said arcuate path for preventing variations in speed thereof, sharply forcing a cutting edge against one side of said strands at such point of resilient support and on a line transverse to the length thereof and radial to the arcuate path of travel for laterally deflecting a short section thereof for severing all the fibers therein at such line, while continuing to support said strands beneath and around said cutting edge, and depositing the severed lengths of said strands onto a collecting surface and moving said surface away from the place of deposition at a linear speed substantially less than the linear speed of said strands.

2. A method for fabricating a continuous uniformly thick and dense mass of heterogeneously arranged, short, multifilament strands that comprises feeding a selected number of continuous multifilament strands of a known weight per linear unit of dimension at a controlled speed over a continuous unbroken resilient surface moving at the same linear speed, squeezing said strands against said surface with a second resilient surface moving at the same linear speed, repeatedly pressing sharp cutting knives against the surface of said strands transversely to their lengths and against said first resilient surface to a point below the normal level of said surface to sharply cut said strands while supporting said strands adjacent to and at the line of cutting, accumulating the cut lengths of mulifilament strands on a plane surface and moving said accumulating mass linearly away at a controlled linear speed less than the linear speed of said strands, whereby the total weight of cut strands moved past a reference point in a unit of time is equal to the total weight of continuous strands fed past said knives in the same unit of time.

3. Apparatus for fabricating a uniformly dense mass of heterogeneously arranged, short, multifilament glass fiber strands comprising, in combination, at least two feeding rollers, the first one of said rollers having a resilient surface, said rollers being mounted on parallel spaced axes with their surfaces in contact, means for guiding a plurality of continuous multifilament strands onto the surface of the first one of said rollers at a point circumferentially remote from the axial line of contact of said rollers and along a circumferentially extending path, a plurality of axially extending, straight edged knives mounted on the second one of said rollers, said knives protruding radially beyond the surface of said second roller a distance at least equal to the diameter of the strands to be severed, said knives being spaced circumferentially on said second roller a distance equal to the length of the short strands to be severed, means for rotating said rollers with their contacting surfaces moving in the same direction and at the same speed, and a continuous conveyor driven at a controlled linear rate of speed less than the linear speed of said strands and beneath said rollers for collecting the severed lengths of said strands into a mat.

4. Apparatus for fabricating a uniformly dense mass having uniform characteristics of heterogeneously arranged, short, multifilament glass fiber strands comprising, in combination, a resilient feeding roller having an unbroken surface, a second unbroken surface roller, said rollers being mounted on parallel spaced axes with their surfaces in contact, means for guiding a plurality of continuous multifilament glass fiber strands between the surfaces of said rollers, a knife roller mounted on an axis parallel to the axes of said first and second rollers and with its surface contacting the surface of said first resilient roller at a point circumferentially remote from the axial line of contact of said first two rollers at least one axially extending, straight edged knife mounted on said knife roller, said knife protruding radially beyond the surface of said knife roller a distance at least equal to the diameter of the strands to be severed, means for rotating all of said rollers with their contacting surfaces moving in the same direction and at the same speed, a conveyor mounted for linear movement beneath said rollers, a hood surrounding the area beneath said rollers and forming an enclosure over said conveyor, and means for moving said conveyor at a controlled linear speed less than the linear speed of said strands whereby the total weight of the cut strands carried past a reference point by said conveyor in a unit of time is equal to the total weight of continuous strands fed past said knives in the same unit of time.

References Cited in the file of this patent

UNITED STATES PATENTS

| | | |
|---|---|---|
| Re. 22,478 | Perkins | May 9, 1944 |
| 1,336,403 | Weiss | Apr. 6, 1920 |
| 1,727,307 | Robinson | Sept. 3, 1929 |
| 1,781,900 | Friede et al. | Nov. 18, 1930 |
| 1,804,254 | Friedrich | May 5, 1931 |
| 2,010,078 | Hale | Aug. 6, 1935 |
| 2,142,475 | Lohmann | Jan. 3, 1939 |
| 2,219,346 | Thomas et al. | Oct. 29, 1940 |
| 2,546,230 | Modigliani | Mar. 27, 1951 |
| 2,566,960 | Philipps | Sept. 4, 1951 |
| 2,577,205 | Meyer et al. | Dec. 4, 1951 |

FOREIGN PATENTS

| | | |
|---|---|---|
| 56,098 | Netherlands | Apr. 15, 1944 |